United States Patent
Ji et al.

(10) Patent No.: US 11,439,987 B2
(45) Date of Patent: *Sep. 13, 2022

(54) MULTI-REGION TWC FOR TREATMENT OF EXHAUST GAS FROM GASOLINE ENGINE

(71) Applicant: Johnson Matthey (Shanghai) Chemicals LTD., Shanghai (CN)

(72) Inventors: Hongyu Ji, Shanghai (CN); Dongsheng Qiao, Shanghai (CN); Xiang Zheng, Shanghai (CN)

(73) Assignee: Johonson Matthey (Shanghai) Chemicals Co., Ltd, Shanghai (CN)

( * ) Notice: Subject to any disclaimer, the term of this patent is extended or adjusted under 35 U.S.C. 154(b) by 48 days.

This patent is subject to a terminal disclaimer.

(21) Appl. No.: 15/733,193

(22) PCT Filed: Dec. 7, 2018

(86) PCT No.: PCT/CN2018/119728
§ 371 (c)(1),
(2) Date: Jun. 8, 2020

(87) PCT Pub. No.: WO2019/109999
PCT Pub. Date: Jun. 13, 2019

(65) Prior Publication Data
US 2020/0391187 A1    Dec. 17, 2020

(30) Foreign Application Priority Data
Dec. 8, 2017   (CN) .......................... 201711293207.2

(51) Int. Cl.
*B01J 21/04*   (2006.01)
*B01J 21/06*   (2006.01)
(Continued)

(52) U.S. Cl.
CPC ............ *B01J 23/58* (2013.01); *B01D 53/945* (2013.01); *B01D 53/9472* (2013.01);
(Continued)

(58) Field of Classification Search
CPC ........ F01N 3/101; F01N 3/2839; B01J 21/04; B01J 21/06; B01J 21/063; B01J 21/066;
(Continued)

(56) References Cited

U.S. PATENT DOCUMENTS

| 6,022,825 A | 2/2000 | Andersen et al. |
| 7,189,376 B2* | 3/2007 | Kumar ................ F01N 13/0097 422/177 |

(Continued)

FOREIGN PATENT DOCUMENTS

| CN | 101224423 A | 7/2008 |
| CN | 101528347 A | 9/2009 |

(Continued)

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end, an outlet end with an axial length L; a first catalytic region beginning at the inlet end and extending for less than the axial length L, wherein the first catalytic region comprises a first palladium component; a second catalytic region beginning at the outlet end and extending for less than the axial length L, wherein the second catalytic region comprises a second palladium component; a third catalytic region beginning at the outlet end and extending for less than the axial length L, wherein the third catalytic region comprises a third rhodium component; and wherein the third catalytic region overlies the second catalytic region.

20 Claims, 2 Drawing Sheets

(51) Int. Cl.
*B01J 21/08* (2006.01)
*B01J 21/12* (2006.01)
*B01J 23/10* (2006.01)
*B01J 23/44* (2006.01)
*B01J 23/46* (2006.01)
*B01J 23/56* (2006.01)
*B01J 23/58* (2006.01)
*B01J 23/63* (2006.01)
*B01J 35/00* (2006.01)
*B01J 35/04* (2006.01)
*B01J 37/02* (2006.01)
*B01J 37/08* (2006.01)
*F01N 3/10* (2006.01)
*F01N 3/28* (2006.01)
*B01D 53/94* (2006.01)

(52) U.S. Cl.
CPC ............. *B01J 23/10* (2013.01); *B01J 23/464* (2013.01); *B01J 35/0006* (2013.01); *B01J 35/04* (2013.01); *B01J 37/0228* (2013.01); *B01J 37/0244* (2013.01); *B01J 37/08* (2013.01); *F01N 3/101* (2013.01); *F01N 3/2839* (2013.01); *B01D 2255/1023* (2013.01); *B01D 2255/1025* (2013.01); *B01D 2255/2042* (2013.01); *B01D 2255/908* (2013.01); *B01D 2255/9035* (2013.01); *B01D 2255/9155* (2013.01); *F01N 2330/02* (2013.01); *F01N 2330/06* (2013.01); *F01N 2370/02* (2013.01); *F01N 2510/06* (2013.01)

(58) Field of Classification Search
CPC ... B01J 21/08; B01J 21/12; B01J 23/10; B01J 23/44; B01J 23/464; B01J 23/56; B01J 23/58; B01J 23/63; B01J 35/0006; B01J 35/04; B01J 37/0228; B01J 37/0244; B01J 37/08
USPC ........ 502/258–262, 304, 327, 332–334, 339, 502/349, 355, 415, 439, 527.12, 527.13, 502/527.19
See application file for complete search history.

(56) References Cited

U.S. PATENT DOCUMENTS

| | | | | |
|---|---|---|---|---|
| 7,517,510 B2* | 4/2009 | Chen | ............... | B01D 53/945 423/213.2 |
| 7,524,465 B2* | 4/2009 | Kumar | ............... | B01D 53/945 422/180 |
| 7,550,124 B2* | 6/2009 | Chen | ............... | B01J 37/0244 423/213.2 |
| 7,758,834 B2* | 7/2010 | Chen | ............... | B01J 37/0248 423/213.2 |
| 8,323,599 B2* | 12/2012 | Nunan | ............... | B01J 35/0006 60/299 |
| 8,394,348 B1* | 3/2013 | Nunan | ............... | B01J 35/04 60/299 |
| 8,557,204 B2* | 10/2013 | Nunan | ............... | B01J 35/0006 422/177 |
| 8,637,426 B2* | 1/2014 | Hoke | ............... | B01J 29/44 502/339 |
| 8,758,695 B2* | 6/2014 | Neubauer | ............... | B01J 29/44 422/180 |
| 8,815,189 B2* | 8/2014 | Arnold | ............... | B01J 35/1076 423/213.2 |
| 8,968,690 B2* | 3/2015 | Nunan | ............... | B01J 35/1019 422/177 |
| 9,040,003 B2 | 5/2015 | Andersen et al. | | |
| 9,327,239 B2* | 5/2016 | Morgan | ............... | B01D 53/9454 |
| 9,352,279 B2 | 5/2016 | Greenwell | | |
| 9,440,192 B2* | 9/2016 | Hoke | ............... | F01N 3/021 |
| 9,643,160 B2* | 5/2017 | Chiffey | ............... | B01J 21/12 |
| 9,744,529 B2* | 8/2017 | Xue | ............... | B01J 35/04 |
| 9,981,258 B2* | 5/2018 | Xue | ............... | B01J 35/04 |
| 10,137,414 B2* | 11/2018 | Hoke | ............... | B01D 53/945 |
| 10,596,550 B2* | 3/2020 | Chandler | ............... | B01J 37/0045 |
| 10,603,655 B2* | 3/2020 | Chandler | ............... | B01J 37/0215 |
| 10,974,228 B2* | 4/2021 | Chandler | ............... | B01J 35/023 |
| 10,987,658 B2* | 4/2021 | Camm | ............... | B01J 21/04 |
| 2001/0053340 A1 | 12/2001 | Noda et al. | | |
| 2004/0001781 A1* | 1/2004 | Kumar | ............... | F01N 3/28 422/180 |
| 2008/0044330 A1 | 2/2008 | Chen et al. | | |
| 2010/0166629 A1* | 7/2010 | Deeba | ............... | B01D 53/944 423/213.5 |
| 2014/0205523 A1 | 7/2014 | Arnold et al. | | |
| 2016/0228818 A1 | 8/2016 | Chang et al. | | |
| 2019/0105636 A1* | 4/2019 | Wang | ............... | B01J 23/464 |
| 2019/0240643 A1* | 8/2019 | Karpov | ............... | B01J 37/0036 |
| 2020/0102868 A1* | 4/2020 | Fujimori | ............... | B01J 23/44 |

FOREIGN PATENT DOCUMENTS

| | | |
|---|---|---|
| CN | 104937225 A | 9/2015 |
| CN | 107206358 A | 9/2017 |
| RU | 2593293 C2 | 8/2016 |
| WO | 2009020957 A1 | 2/2009 |
| WO | 2010001226 A1 | 1/2010 |
| WO | 2012138405 A1 | 10/2012 |
| WO | 2016210221 A1 | 12/2016 |
| WO | 2017117071 A1 | 7/2017 |

* cited by examiner

US 11,439,987 B2

MULTI-REGION TWC FOR TREATMENT OF EXHAUST GAS FROM GASOLINE ENGINE

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

In most catalytic converters, the TWC is coated onto a high surface area substrate that can withstand high temperatures, such as flow-through honeycomb substrates. The large surface area of these substrates facilitates the improvement of the efficiency of the heterogeneous reactions, but can also contribute to the increase of exhaust backpressure, i.e., restrictions on the flow of exhaust gas from the engine to the tail pipe. Despite advances in TWC technology such as those described in U.S. Pat. Nos. 6,022,825, 9,352,279, 9,040,003, and US Pat. Publication No. 2016/0228818, there remains a need for improved catalytic converters for certain engine platforms that simultaneously improve the performance in cold start stage and/or give better light off performance. This invention solves these problems amongst others.

SUMMARY OF THE INVENTION

One aspect of the present disclosure is directed to a catalyst for treating gasoline engine exhaust gas comprising: a substrate comprising an inlet end, an outlet end with an axial length L; a first catalytic region beginning at the inlet end and extending for less than the axial length L, wherein the first catalytic region comprises a first palladium component; a second catalytic region beginning at the outlet end and extending for less than the axial length L, wherein the second catalytic region comprises a second palladium component; a third catalytic region beginning at the outlet end and extending for less than the axial length L, wherein the third catalytic region comprises a third rhodium component; and wherein the third catalytic region overlies the second catalytic region.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

The present invention is directed to the catalytic treatment of combustion exhaust gas, such as that produced by gasoline and other engines, and to related catalyts and systems. More specifically, the invention relates the simultaneous treatment of $NO_x$, CO, and HC in a vehicular exhaust system. The inventors have discovered a synergistic relationship between the certain catalytically active metals and their ways of coating that unexpectedly produces a high conversion rate for $NO_x$, CO, and HC; improves the performance in cold start stage; and gives better light off performance. The processes of the present invention also reduce costs of the catalyst.

One aspect of the present disclosure is directed to a catalyst article for treating exhaust gas comprising: a substrate comprising an inlet end, an outlet end with an axial length L; a first catalytic region beginning at the inlet end and extending for less than the axial length L, wherein the first catalytic region comprises a first palladium component; a second catalytic region beginning at the outlet end and extending for less than the axial length L, wherein the second catalytic region comprises a second palladium component; a third catalytic region beginning at the outlet end and extending for less than the axial length L, wherein the third catalytic region comprises a third rhodium component; and wherein the third catalytic region overlies the second catalytic region.

The inventors have found that these catalysts in this way of coating show better catalyst performance that is not achieved using the catalyst separately or in conventional ways of coating. Among the unexpected benefits of the present invention are improved light off performance, during vehicle cold start stage, significantly reduced emissions of exhaust pollutions, and thus more easily achieved emission targets, compared to conventional TWC catalysts of similar concentration (e.g., washcoat loadings). The achievement of these benefits lead to the amounts of noble metals used in the catalysts and lower costs.

The first catalytic region can extend for 30 to 70 percent of the axial length L. Preferably, the first catalytic region can extend for 40 to 60 percent, more preferably, 45 to 55 percent of the axial length L.

The second catalytic region can extend for 30 to 70 percent of the axial length L. Preferably, the second catalytic region can extend for 40 to 60 percent, more preferably, 45 to 55 percent of the axial length L.

Figure 1:
FIG. 1 shows one embodiment according to the present invention, the total length of the second catalytic region and the first catalytic region equals to the axial length L of the substrate.
Figure 2A:
FIG. 2a and FIG. 2b show two embodiments according to the present invention, the second catalytic region overlaps with the first catalytic region.
Figure 2B:

The second catalytic region can overlap with the first catalytic region for 0.1 to 15 percent of the axial length L (e.g., see FIG. 2a and FIG. 2b, the first catalyst region can overlie the second catalytic region or the second catalyst region can overlie the first catalytic region). Alternatively, the total length of the second catalytic region and the first catalytic region can equal to the axial length L (e.g., see FIG.

Figure 3:
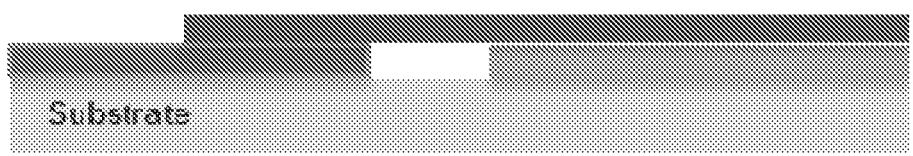
FIG. 3 shows one embodiment according to the present invention, the total length of the second catalytic region and the first catalytic region is less than the axial length L of the substrate.

1). In yet another alternative, the total length of the second catalytic region and the first catalytic region can be less than the axial length L, for example, no greater than 95%, 90%, 80%, or 70% of the axial length L (e.g., see FIG. 3)

The third catalytic region can extend for 50 to 99 percent of the axial length L. Preferably, the third catalytic region can extend for 50 to 95 percent, more preferably, 60 to 95 percent of the axial length L.

The first catalytic region can be essentially free of PGM metals other than the first palladium component.

The first catalyst layer can comprise PGM metals other than the first palladium component, such as platinum and/or rhodium. The first catalytic region can comprise 0.1-300 g/ft$^3$ of the first palladium or platinum palladium component. Preferably, the first catalytic region can comprise 50-250 g/ft$^3$ of the first palladium or platinum palladium component, more preferably, 100-220 g/ft$^3$ of the first palladium or platinum palladium component, wherein the weight ratio of platinum to palladium can be 60:1 to 1:60, preferably 30:1 to 1:30, more preferably 10:1 to 1:10.

The total washcoat loading of the first catalyst region can be less than 3.5 g/in$^3$, preferably, less than 3.0 g/in$^3$, 2.5 g/in$^3$, or 1.5 g/in$^3$.

The first catalytic region can further comprise a first oxygen storage capacity (OSC) material, a first alkali or alkaline earth metal component, and/or a first inorganic oxide.

The first OSC material is preferably selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as lanthanum, neodymium, praseodymium, yttrium oxides, etc. In addition, the first OSC material may function as a support material for the first palladium component.

The first palladium component can be supported on both the first inorganic oxide and the first OSC material.

The ceria-zirconia mixed oxide can have a molar ratio of zirconia to ceria at least 50:50, preferably, higher than 60:40, more preferably, higher than 75:25.

The first OSC material (e.g., ceria-zirconia mixed oxide) can be from 10 to 90 wt %, preferably, 25-75 wt %, more preferably, 30-60 wt %, based on the total washcoat loading of the first catalytic region.

The first OSC material loading in the first catalytic region can be less than 1.5 g/in$^3$. In some embodiments, the first OSC material loading in the first catalytic region is no greater than 1.2 g/in$^3$, 1.0 g/in$^3$, 0.9 g/in$^3$, 0.8 g/in$^3$, or 0.7 g/in$^3$.

In some embodiments, the first alkali or alkaline earth metal may be deposited on the first OSC material. Alternatively, or in addition, the first alkali or alkaline earth metal may be deposited on the first inorganic oxide. That is, in some embodiments, the first alkali or alkaline earth metal may be deposited on, i.e. present on, both the first OSC material and the first inorganic oxide.

The first alkali or alkaline earth metal is generally in contact with the first inorganic oxide. Preferably the first alkali or alkaline earth metal is supported on the first inorganic oxide. Alternatively, the first alkali or alkaline earth metal may be in contact with the first OSC material.

The first alkali or alkaline earth metal is preferably barium, or strontium, and mixed oxides or composite oxides thereof. Preferably the barium or strontium, where present, is loaded in an amount of 0.1 to 15 wt %, and more preferably 3 to 10 wt % of barium or strontium, based on the total weight of the first catalytic region.

It is even more preferable that the first alkali or alkaline earth metal is strontium. The strontium, where present, is preferably loaded in an amount of 0.1 to 15 wt %, and more preferably 3 to 10 wt %, based on the total weight of the first catalytic region.

It is also preferable that the first alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the first catalytic region. It is more preferable that the first alkali or alkaline earth metal is composite oxide of barium and strontium.

Preferably the barium or the strontium is present as $BaCO_3$ or $SrCO_3$. Such a material can be performed by any method known in the art, for example incipient wetness impregnation or spray-drying.

The first inorganic oxide is preferably an oxide of Groups 2, 3, 4, 5, 13 and 14 elements The first inorganic oxide is preferably selected from the group consisting of alumina, magnesia, silica, ceria, barium oxides, and mixed oxides or composite oxides thereof. Particularly preferably, the first inorganic oxide is alumina, lanthanum-alumina, ceria, or a magnesia/alumina composite oxide. One especially preferred first inorganic oxide is alumina or lanthanum-alumina composite oxides.

The first OSC material and the first inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The second catalytic region can be essentially free of PGM metals other than the second palladium component.

The second catalyst layer can comprise PGM metals other than the second palladium component, such as platinum and/or rhodium. The second catalytic region can comprise 0.1-100 g/ft$^3$ of the second palladium or platinum palladium component. Preferably, the second catalytic region can comprise 5-60 g/ft$^3$, more preferably, 10-50 g/ft$^3$ of the second palladium or platinum palladium component, wherein the weight ratio of platinum to palladium can be 60:1 to 1:60, preferably 30:1 to 1:30, more preferably 10:1 to 1:10.

The second catalytic region can further comprise a second oxygen storage capacity (OSC) material, a second alkali or alkaline earth metal component, and/or a second inorganic oxide.

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. In addition, the second OSC material may further comprise one or more of dopants like lanthanum, neodymium, praseodymium, yttrium etc. Moreover, the second OSC material may have the function as a support material for the second palladium component.

The second palladium or platinum palladium component can be supported on both the second inorganic oxide and the second OSC material.

The ceria-zirconia mixed oxide can have a molar ratio of zirconia to ceria at least 50:50, preferably, higher than 60:40, more preferably, higher than 75:25.

The second OSC material (e.g., ceria-zirconia mixed oxide) can be from 10 to 90 wt %, preferably, 25-75 wt %, more preferably, 30-60 wt %, based on the total washcoat loading of the second catalytic region.

The second OSC material loading in the second catalytic region can be less than 1.5 g/in$^3$. In some embodiments, the second OSC material loading in the second catalytic region is no greater than 1.2 g/in$^3$, 1.0 g/in$^3$, 0.9 g/in$^3$, 0.8 g/in$^3$, or 0.7 g/in$^3$.

The total washcoat loading of the second catalyst region can be less than 3.5 g/in$^3$, preferably, less than 3.0 g/in$^3$, 2.5 g/in$^3$, or 1.5 g/in$^3$.

In some embodiments, the second alkali or alkaline earth metal may be deposited on the second OSC material. Alternatively, or in addition, the second alkali or alkaline earth metal may be deposited on the second inorganic oxide. That is, in some embodiments, the second alkali or alkaline earth metal may be deposited on, i.e. present on, both the second OSC material and the second inorganic oxide.

The second alkali or alkaline earth metal is generally in contact with the second inorganic oxide. Preferably the second alkali or alkaline earth metal is supported on the second inorganic oxide. In addition to, or alternatively to, being in contact with the second inorganic oxide, the second alkali or alkaline earth metal may be in contact with the second OSC material.

The second alkali or alkaline earth metal is preferably barium, strontium, mixed oxides or composite oxides thereof. Preferably the barium or strontium, where present, is in an amount of 0.1 to 15 wt %, and more preferably 3 to 10 wt % of barium or strontium, based on the total weight of the second catalytic region.

It is even more preferable that the second alkali or alkaline earth metal is strontium. The strontium, where present, is preferably present in an amount of 0.1 to 15 wt %, and more preferably 3 to 10 wt %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements The second inorganic oxide is preferably selected from the group consisting of alumina, magnesia, silica, ceria, barium oxides, and mixed oxides or composite oxides thereof. Particularly preferably, the second inorganic oxide is alumina, lanthanum-alumina, ceria, or a magnesia/alumina composite oxide. One especially preferred second inorganic oxide is alumina or lanthanum-alumina composite oxides.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The third catalytic region can be essentially free of PGM metals other than the third rhodium component.

The third catalytic region can comprise 0.1-20 g/ft$^3$ of the third rhodium or platinum rhodium component. Preferably, the third catalytic region can comprise 3-15 g/ft$^3$, more preferably, 5-13 g/ft$^3$ of the third rhodium or platinum rhodium component, wherein the weight ratio of platinum to rhodium can be 20:1 to 1:20, preferably 15:1 to 1:15, more preferably 10:1 to 1:10.

The total washcoat loading of the second catalyst region can be less than 3.5 g/in$^3$; preferably, less than 3.0 g/in$^3$ or 2 g/in$^3$; more preferably, less than 1.5 g/in$^3$ or 1.0 g/in$^3$.

The third catalytic region can further comprise a third oxygen storage capacity (OSC) material, a third alkali or alkaline earth metal component, and/or a third inorganic oxide.

The third OSC material is preferably selected from the group consisting of cerium oxide, zirconium oxide, a ceria-zirconia mixed oxide, and an alumina-ceria-zirconia mixed oxide. Preferably the third OSC material comprises ceria-zirconium mixed oxide, with one or more of dopants of lanthanum, neodymium, yttrium, praseodymium, etc. In addition, the third OSC material may function as a support material for the third rhodium component.

The ceria-zirconia mixed oxide can have a molar ratio of zirconia to ceria at least 50:50; preferably, higher than 60:40; and more preferably, higher than 80:20.

The third OSC material can be from 10 to 90 wt %; preferably, 25-75 wt %; more preferably, 35-65 wt %; based on the total washcoat loading of the third catalytic region.

The third OSC material loading in the third catalytic region can be less than 2 g/in$^3$. In some embodiments, the third OSC material loading in the third catalytic region is no greater than 1.5 g/in$^3$, 1.2 g/in$^3$, 1.0 g/in$^3$, or 0.5 g/in$^3$.

Preferably, the third catalytic region is substantially free of the third alkali or alkaline earth metal, more preferably essentially free of the third alkali or alkaline earth metal.

The third inorganic oxide is preferably an oxide of Groups 2, 3, 4, 5, 13 and 14 elements. The third inorganic oxide is preferably selected from the group consisting of alumina, ceria, magnesia, silica, lanthanum, zirconium, neodymium, praseodymium oxides, and mixed oxides or composite oxides thereof. Particularly preferably, the third inorganic oxide is alumina, a lanthanum/alumina composite oxide, or a zirconium/alumina composite oxide. One especially preferred third inorganic oxide is a lanthanum/alumina composite oxide or a zirconium/alumina composite oxide. The third inorganic oxide may be a support material for the third rhodium component, and/or for the third OSC materials.

Preferred the third inorganic oxides preferably have a fresh surface area of greater than 80 m$^2$/g, pore volumes in the range 0.1 to 4 mL/g. High surface area inorganic oxides having a surface area greater than 100 m$^2$/g are particularly preferred, e.g. high surface area alumina. Other preferred the third inorganic oxides include lanthanum/alumina composite oxides, optionally further comprising a zirconium-containing component, e.g. zirconia. In such cases the zirconium may be present on the surface of the lanthanum/alumina composite oxide, e.g. as a coating.

The third OSC material and the third inorganic oxide can have a weight ratio of at least 1:1, preferably, at least 2:1, more preferably, at least 3:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3.

In some embodiments, the first palladium component and the second palladium component has a weight ratio of from 50:1 to 1:50. In further embodiments, the first palladium component and the second palladium component has a weight ratio of from 30:1 to 1:30. In another further embodiment, the first palladium component and the second palladium component has a weight ratio of from 10:1 to 1:10. In yet another further embodiment, the first palladium component and the second palladium component has a weight ratio of from 5:1 to 1:5.

It is preferred that the first palladium component and the second palladium component has a weight ratio of greater than 1:1, more preferred, at least 3:1 or 4:1; even more preferred, at least 5:1.

In some embodiments, the third rhodium component and the first palladium component has a weight ratio of from 60:1 to 1:60. Preferably, the third rhodium component and the first palladium component has a weight ratio of from 40:1 to 1:40. More preferably, the third rhodium component and the first palladium component has a weight ratio of from 30:1 to 1:30. Most preferably, the third rhodium component and the first palladium component has a weight ratio of from 10:1 to 1:10.

The catalyst article of the invention may comprise further components that are known to the skilled person. For example, the compositions of the invention may further comprise at least one binder and/or at least one surfactant. Where a binder is present, dispersible alumina binders are preferred.

Preferably the substrate is a flow-through monolith.

The substrate can be more than 90 mm in length.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

In some embodiments, the first catalytic region can be supported/deposited directly on the substrate. In certain embodiments, the second catalytic region can be supported/deposited directly on the substrate.

Another aspect of the present disclosure is directed to a method for treating a vehicular exhaust gas containing $NO_x$, CO, and HC using the catalyst article described herein. Catalytic converters equipped with the TWC made according to this method show improved compared to conventional TWC (with the same PGM loading), also show especially improved performance in cold start stage and better THC light off performance (e.g., see Examples 1 and 2 and Tables 1 and 2).

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel. Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel. Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Catalyst A:

First Catalytic Region:

The first catalytic region consists of Pd supported on a washcoat of a first CeZr mixed oxide, La-stabilized alumina, and Ba promotor. The washcoat loading of the first catalytic region was about 1.7 $g/in^3$ with a Pd loading of 200 $g/ft^3$.

This washcoat was then coated from the inlet face of a ceramic substrate (750 cpsi, 2.5 mil wall thickness) using standard coating procedures with coating depth targeted of 50% of the substrate length, dried at 90° C.

Second Catalytic Region:

The second catalytic region consists of Pd supported on a washcoat of a second CeZr mixed oxide, La-stabilized alumina, and Ba promotor. The washcoat loading of the second catalytic region was about 1.7 $g/in^3$ with a Pd loading of 34 $g/ft^3$.

This second washcoat was then coated from the outlet face of the ceramic substrate containing the first catalytic region from above, using standard coating procedures with coating depth targeted of 50% of the substrate length, dried at 90° C. and calcined at 500° C. for 45 mins.

Third Catalytic Region:

The third catalytic region consists of Rh supported on a washcoat of a third CeZr mixed oxide and La-stabilized alumina. The washcoat loading of the third catalytic region was about 1.3 $g/in^3$ with a Rh loading of 8 $g/ft^3$.

The third washcoat was then coated from the outlet face of the ceramic substrate containing the first and the second catalytic regions from above, using standard coating procedures with coating depth targeted of 90% of the substrate length, dried at 90° C. and calcined at 500° C. for 45 mins.

Comparative Catalyst B:

Comparative Catalyst B is prepared according to the similar procedure as Catalyst A with the exception that the third catalytic region in Comparative Catalyst B was coated for the entire length of the substrate (i.e., 100%). The total Pd loading was 117 g/ft$^3$ and the total Rh loading was 8 g/ft$^3$.

Comparative Catalyst C:

Comparative Catalyst C is a commercial three-way (Pd—Rh) catalyst with a double-layered structure. The bottom layer consists of Pd supported on a washcoat of a first CeZr mixed oxide, La-stabilized alumina, and Ba promotor. The washcoat loading of the bottom layer was about 1.7 g/in$^3$ with a Pd loading of 117 g/ft$^3$. The top layer consists of Rh supported on a washcoat of a second CeZr mixed oxide, and La-stabilized alumina. The washcoat loading of the top layer was about 1.3 g/in$^3$ with a Rh loading of 8 g/ft$^3$. The total washcoat loading of Catalyst C was about 3.0 g/in$^3$.

Catalyst D

Catalyst D is prepared according to the similar procedure as Catalyst A with the exception that 50% Ba promoter was replaced by Sr in first catalytic region.

Catalyst E

Catalyst E is prepared according to the similar procedure as Catalyst A with the exception that 100% Ba promoter was replaced by Sr in first catalytic region.

Example 1: Vehicle Testing Procedures and Results

The fresh performances of Catalyst A and Comparative Catalyst B and Comparative Catalyst C were tested over a vehicle of 1.5-liter engine with New European Driving Cycle (NEDC). Bag data from the tailpipe are shown in Table 1. Catalyst A of the present invention presents the significantly lower emission of THC, CO and NO$_x$ compared with Comparative Catalysts B & C. (e.g., see the improved performance related with around 20%, 10% and 24% improvement respectively on THC, CO and NO$_x$ emission, when Catalyst A is compared with Comparative Catalyst B).

TABLE 1

Results of Exhaust Emissions by Vehicle Diluted Bag Data

| | Exhaust Emissions (g/km) | | | |
|---|---|---|---|---|
| | THC | NMHC | CO/10 | NO$_x$ |
| Catalyst A | 0.040 | 0.033 | 0.027 | 0.014 |
| Comparative Catalyst B | 0.050 | 0.041 | 0.030 | 0.025 |
| Comparative Catalyst C | 0.070 | 0.060 | 0.047 | 0.024 |

Figure 4A:
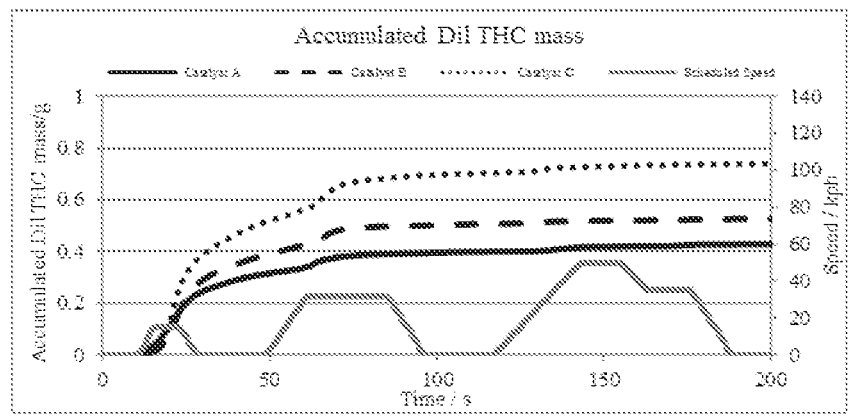
FIGS. 4a, 4b and 4c show accumulated diluted bag emission of THC, CO and $NO_x$ respectively from a vehicle testing of Catalyst A, Comparative Catalyst B, and Comparative Catalyst C.
Figure 4B:
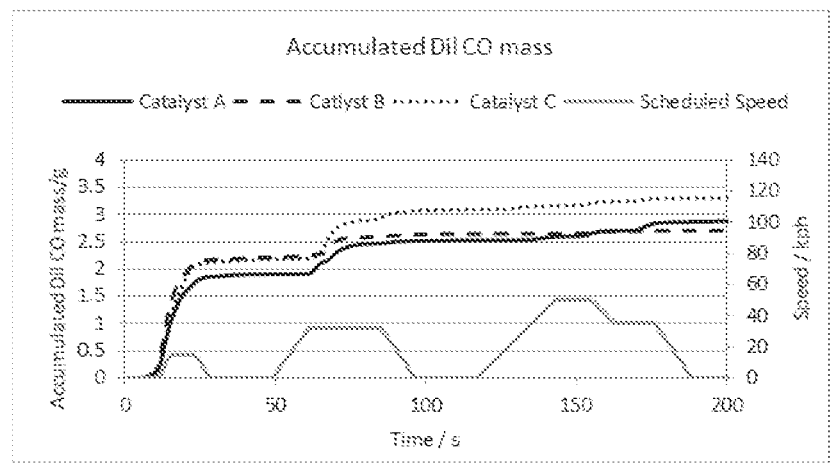
Figure 4C:
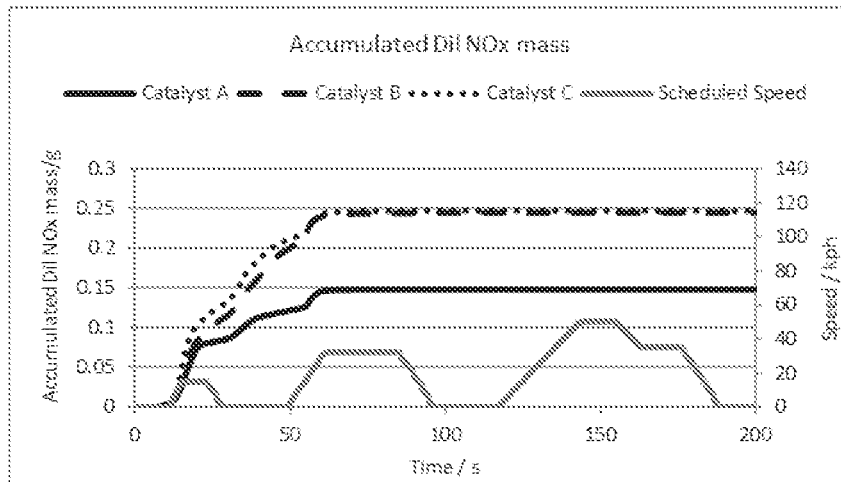

In addition, as shown in FIGS. 4a, 4b and 4c, Catalyst A of the present invention presents significantly improved emission control performance at cold start stage, compared with Comparative Catalysts B & C. The accumulated emissions data summary of first 30 s, 50 s, 100 s from driving cycle are shown in Table 2.

TABLE 2

Results of Accumulated Exhaust Emissions at Cold Start Stage

| | Accumulated Exhaust Emissions at first 30, 50, 100 s (g) | | | | | | | | |
|---|---|---|---|---|---|---|---|---|---|
| | THC | | | CO | | | NO$_x$ | | |
| | 30 s | 50 s | 100 s | 30 s | 50 s | 100 s | 30 s | 50 s | 100 s |
| Catalyst A | 0.25 | 0.32 | 0.39 | 1.86 | 1.90 | 2.51 | 0.09 | 0.12 | 0.15 |
| Comparative Catalyst B | 0.29 | 0.39 | 0.50 | 2.17 | 2.22 | 2.63 | 0.12 | 0.20 | 0.24 |
| Comparative Catalyst C | 0.39 | 0.52 | 0.70 | 2.12 | 2.17 | 3.07 | 0.13 | 0.21 | 0.25 |

Example 2: Light Off Performances Test in Engine Testing

Catalysts A and Comparative Catalyst B were tested separately over a gasoline engine. The light off performance is a typical condition with exhaust flow rate of 80 kg/hrs, temperature ramp is 30° C./min, the lambda of Air and Fuel Ratio (AFR) at 14.55. the conversion of THC, CO and NO$_x$ were calculated from comparing the concentration of the feed gas and the gas at the outlets of the catalysts. Before the engine light off testing. Catalysts A and Comparative Catalyst B were bench aged under 6.1-L engine in the same run for 100 hrs with four mode aging cycle, with peak bed temperature at 980° C. of the catalysts.

The HC, CO and NO$_x$ T$_{50}$ light off temperatures of Catalysts A and Comparative Catalyst B are shown in Table 3. The data indicates that, surprisingly, the multi-region Catalyst A of the present invention gives significantly improved light-off performance when compared with the two-layer example of Comparative Catalyst B, with about 20° C. lower T$_{50}$ (T$_{50}$ is the temperature when the conversion reaching 50%).

TABLE 3

Engine Bench Light Off Test Results

| Pollutant | T$_{50}$ (° C.) Catalyst A | T$_{50}$ (° C.) Comparative Catalyst B |
|---|---|---|
| HC | 302.5 | 323.5 |
| CO | 297.7 | 316.2 |
| NO$_x$ | 298.6 | 319.8 |

Example 3: Vehicle Testing Procedures and Results

The bench aged samples of Catalyst A, Catalyst D, and Catalyst E were tested over a vehicle of 1.5-liter engine with New European Driving Cycle (NEDC). The bench aging under 6.1-L engine in the same run for 150 hrs with four mode aging cycle, with peak bed temperature at about 980° C. of the catalysts. Results of vehicle exhaust diluted bag data are shown in Table 4. Catalyst D & Catalyst E of the present invention presents the even lower emission of THC, CO and NO$_x$, compared with Catalyst A (e.g., see the improved performance related with around 26%, 18%, and 14% improvement respectively on THC, CO and NO$_x$ emission, when Catalyst E is compared with Catalyst A).

TABLE 4

Results of Emissions by Vehicle Diluted Bag Data

| | Exhaust Emissions (g/km) | | | |
|---|---|---|---|---|
| | THC | NMHC | CO/10 | $NO_x$ |
| Catalyst A | 0.098 | 0.083 | 0.049 | 0.084 |
| Catalyst D | 0.092 | 0.078 | 0.049 | 0.079 |
| Catalyst E | 0.072 | 0.061 | 0.04 | 0.072 |

We claim:

1. A catalyst article for treating exhaust gas comprising:
a substrate comprising an inlet end, an outlet end with an axial length L;
a first catalytic region beginning at the inlet end and extending for 30 to 70 percent of the axial length L, wherein the first catalytic region comprises a first palladium component and a first oxygen storage capacity (OSC) material;
a second catalytic region beginning at the outlet end and extending for 30 to 70 percent of the axial length L, wherein the second catalytic region comprises a second palladium component and a second OSC material;
a third catalytic region beginning at the outlet end and extending for 50 to 95 percent of the axial length L, wherein the third catalytic region comprises a third rhodium component;
wherein the third catalytic region overlies the second catalytic region; and
wherein the first palladium component and the second palladium component have a weight ratio of greater than 1:1.

2. The catalyst article of claim 1, wherein the second catalytic region overlaps with the first catalytic region for 1 to 15 percent of the axial length L.

3. The catalyst article of claim 1, wherein the total length of the second catalytic region and the first catalytic region equals to the axial length L.

4. The catalyst article of claim 1, wherein the total length of the second catalytic region and the first catalytic region is less than the axial length L.

5. The catalyst article of claim 1, wherein the third catalytic region extends for 60 to 95 percent of the axial length L.

6. The catalyst article of claim 1, wherein the first catalytic region is essentially free of PGM metals other than the first palladium component.

7. The catalyst article of claim 1 wherein the first catalytic region comprises 50-250 g/ft³ of the first palladium component.

8. The catalyst article of claim 1, wherein the first catalytic region further comprises a first alkali or alkaline-earth metal component and/or a first inorganic oxide.

9. The catalyst article of claim 1, wherein the second catalytic region is essentially free of PGM metals other than the second palladium component.

10. The catalyst article of claim 1, wherein the second catalytic region comprises 5-60 g/ft³ of the second palladium component.

11. The catalyst article of claim 10, wherein the second catalytic region comprises 10-50 g/ft³ of the second palladium component.

12. The catalyst article of claim 1, wherein the second catalytic region further comprises a second alkali or alkaline-earth metal component and/or a second inorganic oxide.

13. The catalyst article of claim 1, wherein the third catalytic region comprises 0.1-20 g/ft³ of the third rhodium component.

14. The catalyst article of claim 1, wherein the third catalytic region further comprises a third oxygen storage capacity (OSC) material, a third alkali or alkaline-earth metal component, and/or a third inorganic oxide.

15. The catalyst article of claim 1, wherein the substrate is a flow-through monolith.

16. The catalyst article of claim 1, wherein the substrate is more than 90 mm in length.

17. The catalyst article of claim 1, wherein the first catalytic region is supported/deposited directly on the substrate.

18. The catalyst article of claim 1, wherein the second catalytic region is supported/deposited directly on the substrate.

19. The catalyst article of claim 1, wherein the first palladium component and the second palladium component have a weight ratio of at least 3:1.

20. An emission treatment system for treating a flow of a combustion exhaust gas comprising the catalyst article of claim 1.

* * * * *